United States Patent [19]

Morse

[11] 4,162,881

[45] Jul. 31, 1979

[54] PELLET MILL WITH IMPROVED FEED SYSTEM

[76] Inventor: George W. Morse, 9444 S. Wales Way, Elk Grove, Calif. 95624

[21] Appl. No.: 909,286

[22] Filed: May 24, 1978

[51] Int. Cl.[2] .......................... B29C 1/00; B30B 3/00; B30B 4/28

[52] U.S. Cl. .................................... 425/331; 425/362; 425/DIG. 230

[58] Field of Search .............. 425/331, 362, DIG. 230

[56] References Cited

U.S. PATENT DOCUMENTS 3,981,665 9/1976 Spencer ................................ 425/331

*Primary Examiner*—J. Howard Flint, Jr.

*Attorney, Agent, or Firm*—Flehr, Hohbach, Test, Albritton & Herbert

[57] ABSTRACT

A pellet mill with first and second side-by-side rollers disposed in respective first and second hemispheres of rotation of a vertical rotatable cylindrical pellet die member divided along a vertical center line. Pelletizable material is fed in independent first and second conduits for each roller. The first conduit deposits the pelletizable material in the first hemisphere above the first roller; while the second conduit supplies the pelletizable material also in the first hemisphere of rotation below the first roller. Thus, such material is initially deposited on the die member from the conduit and is carried during rotation by centrifugal force to the second roller. Gravity assists retention of the material during rotation to the bottom of the die.

5 Claims, 4 Drawing Figures

FIG.—1
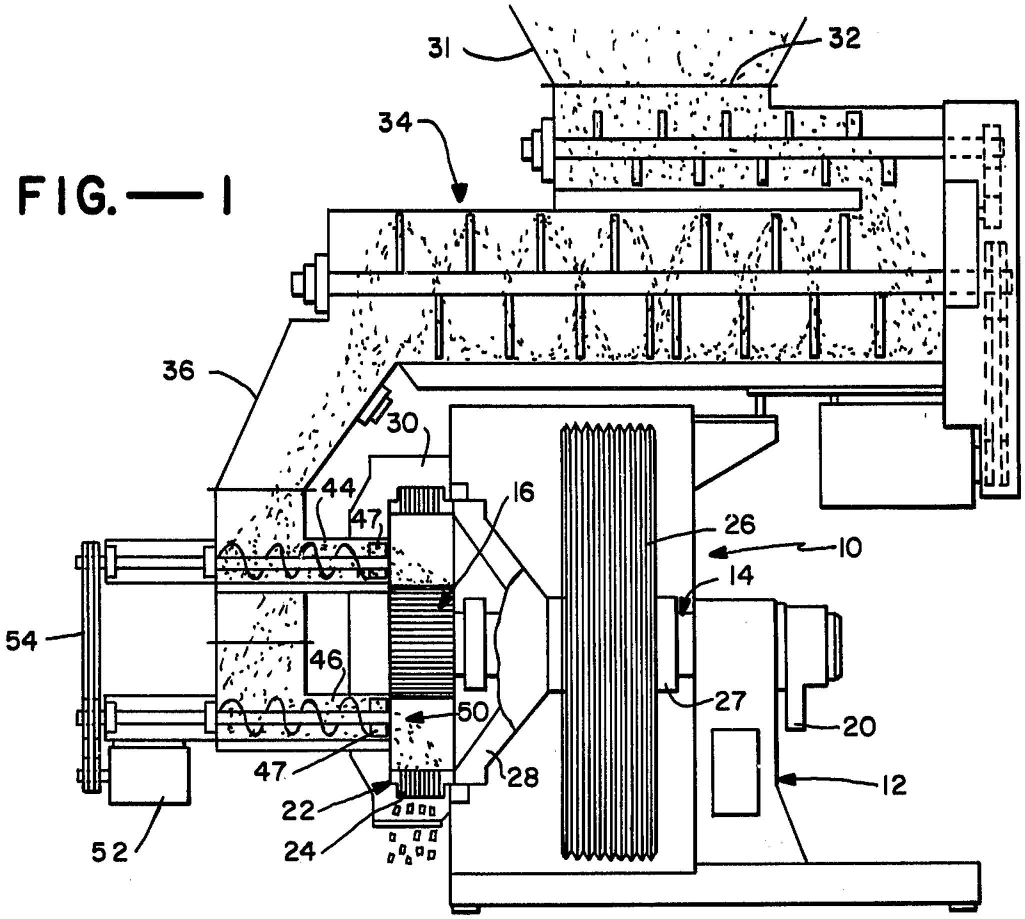
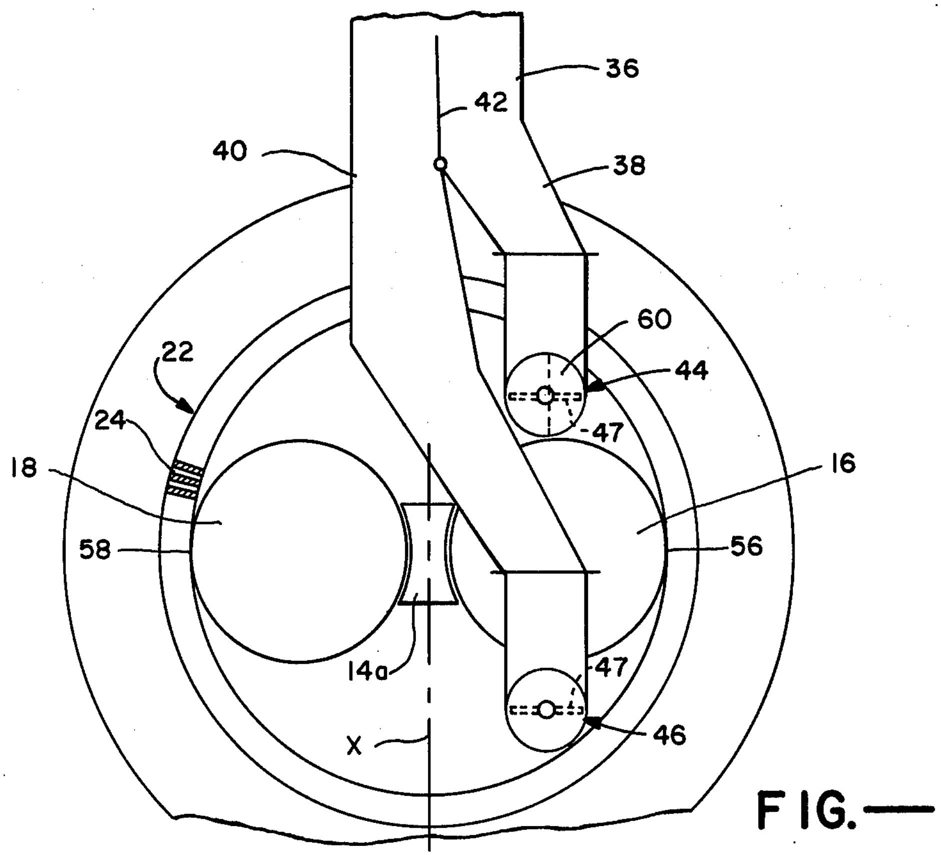
FIG.—2

PELLET MILL WITH IMPROVED FEED SYSTEM

BACKGROUND OF THE INVENTION

This invention relates to a rotary two roller pellet mill for hay or the like.

A number of pellet mills are available which include two rollers which act on a vertical rotatable cylindrical pellet die member to form pellets by extruding pelletizable material (e.g., hay) through the die member. In one type of mill, two rollers are mounted to a single shaft having a safety shear pin to permit rotation of the shaft upon jamming or overloading. In this type of pellet mill, to permit free rotation of the shaft upon shearing of the shear pin, the pelletizable material is directed to the die cavity without the conveying screws projecting into the vertical plane of the rollers. Independent feed conduits have been employed for such pellet mills. In general, they are located directly adjacent to the V-shaped section of the pressing zone formed between its respective roller and rotating die. This type of configuration has lead to uneven distribution of pelletizable material between the two rollers and consequent uneven roller wear, increased vibration, reduced productivity, and a tendency to form a nonhomogeneous distribution in the pelletizable material contacting the different rollers. Pellets formed in this manner tend to be less durable than ones with homogeneous distributions.

SUMMARY OF THE INVENTION AND OBJECTS

In accordance with the present invention, independent feed conduits are provided for each roller of a two roller pellet mill including a vertical, rotatable, cylindrical pellet die member. First and second rollers are disposed in the first and second hemispheres of rotation of the die member divided by a vertical center line while the conduits deposit essentially all of the pelletizable material in the first hemisphere of rotation, above and below the first roller therein. In this manner, pelletizable material below the first roller is deposited on the die member and spread uniformly thereon under the influence of gravity and is carried during rotation to the bottom of the die member where it is held by centrifugal force for rotation into contact with the second roller. By appropriate adjustment of the feed to the two conduits, this system permits uniform, homogeneous distribution of pelletizable material to the first and second rollers.

It is an object of the invention to provide a two roller pellet mill which overcomes the above-named disadvantages.

A specific object of the invention is to provide a pellet mill of the foregoing type with uniform feed to each roller and consequent equal wear on the die and on each roller, increased productivity, and eliminate pellet hole plugging and burning of the pellets.

It is a further object of the invention to provide a pellet mill of the foregoing type with a homogeneous distribution of particle sizes in pellets formed at each roller.

It is another object of the invention to provide a feeding system whereby pellet mill shock loading and excessive vibration are essentially eliminated.

Additional objects and features of the invention will appear from the following description in which the preferred embodiment is set forth in detail in conjunction with the accompanying drawing.

BRIEF DESCRIPTION OF THE DRAWING

FIG. 1 is a side elevational view, partially in section, of apparatus with a feed mechanism in accordance with the present invention.

FIG. 2 is an end view, partially in section, of the pellet die cavity and feed mechanism of FIG. 1.

DETAILED DESCRIPTION OF THE PREFERRED EMBODIMENTS

Figure 3:
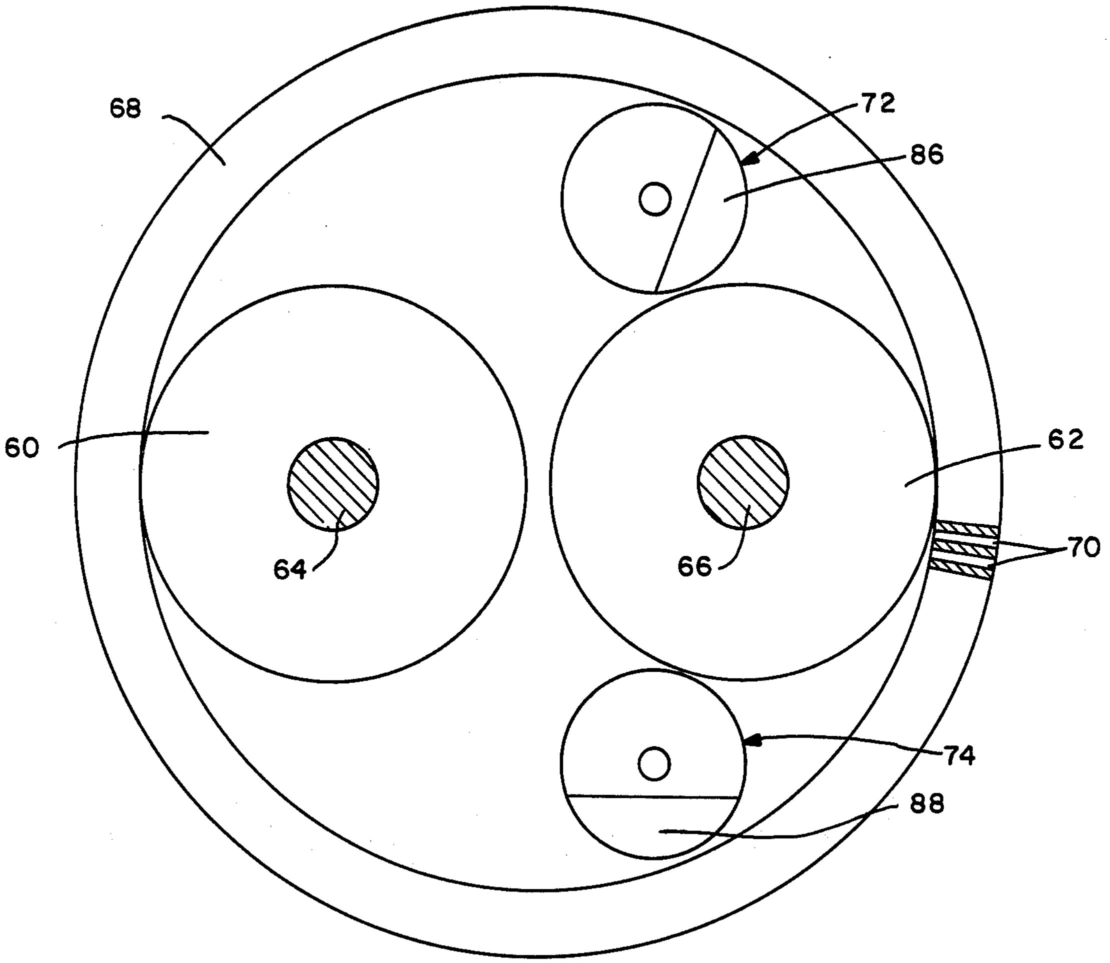
FIG. 3 is an end view, partially in section, of a pellet die cavity of a different pellet mill according to the present invention.

Referring to the drawing, a pellet mill, generally designated by the number 10, includes a frame 12 upon which is mounted a shaft 14 bearing side-by-side rotatable rollers 16 and 18, separated by a shaft projection **14*a* conforming to the adjacent surfaces of the rollers. Shaft 14 includes a shear pin 20 as a safety factor which shears upon overloading of rollers 16 or 18**, indicative of debris in the pellet mill which could cause damage.

Means forming a pellet die cavity is provided including a vertical rotatable pellet die ring member 22 with cylindrical die openings 24 located around the entire die member. Means is provided for rotating die member 22 consisting of a motor, not shown, which drives a pulley assembly 26 mounted to quill shaft 27 with a conical sleeve projection 28 rigidly mounted to the die member. Shaft 27 is mounted by bearings to shaft 14. The die cavity is defined at its inner vertical plane by a plate, not shown, through which shaft 14 projects. The external vertical plane of the die cavity is defined by the flat vertical circular portion of generally cylindrical end plate 30 which includes a cylindrical wall on the same axis as die member 22 but spaced apart therefrom to permit the collection of pellets passing through die openings 24. Apparatus of this general type is sold under the same "Kupex Pellet Mill" by Buhler Bros. of Switzerland and under the designation "Model 200" by California Pellet Mill Company.

A large variety of material can be pelletized by such a pellet mill. For example, the pellets may be employed in the mixed feed industry, oil industry, flour milling or bran pelletizing, and for the manufacture of cattle feeds. It is well suited for pelletizing of a pulverized finely ground alfalfa hay product formed by dehydration of a leafy legume. Such leguminous materials include a gradation of particle sizes and densities with a leafy vein-containing portion and a stem portion with a latent adhesive material activated by contact with water.

For many pelletizable materials, such as hay, it is advantageous to provide heated water in the form of steam or the like to the product prior to or simultaneously with pelletizing. This may be accomplished in a number of different techniques. One technique illustrated in FIG. 1 includes a hopper 31 which drops material into a feeding screw assembly 32 which directs the pelletizable material to a mixing screw assembly 34 to which steam and/or other liquids are added. From there, the moistened pelletizable material is directed through main conduit 36 which splits into independent first and second feed conduits 38 and 40, respectively. Adjustable means is provided splitting the stream of pelletizable material from conduit 36 between conduits 38 and 40 consisting of a valve suitably in the form of adjustable pivotally mounted blade 42.

Conduits 38 and 40 are connected to horizontal augers 44 and 46, respectively, which include outlet openings 48 and 50, respectively. The screws of augers 44 and 46 are driven by motor 52 connected by a common pulley system 54 to the respective auger screws or, if desired, by separate motors. Paddles 47 are provided at the openings of augers 44 and 46 to assist in distribution of the pelletizable material.

An essential feature of the present invention is the spacial relationship of feed openings 48 and 50 in the pellet die cavity and particularly with respect to rollers 16 and 18. In the illustrated embodiment, rollers 16 and 18 are mounted side-by-side 180° apart at opposing surfaces of die member 22 so that a line through the axes of the two rollers are disposed in a generally horizontal direction, namely, within about 15° of the horizontal. Rollers 16 and 18 are each closely adjacent to the die member surface and form therewith first and second pressing zone 56 and 58, respectively.

Assuming clockwise rotation of die member 22 in FIG. 2, pressing zone 56 is disposed in the first hemisphere of rotation from the top of the die member divided along a vertical center line X while pressing zone 58 is disposed in the second hemisphere of rotation. As illustrated, the outlet opening of auger 44 is disposed to deposit the pelletizable material in the first hemisphere of rotation directly above roller 16. As opening 48 does not project to the vertical plane of the rollers, permitting operation of safety shear pin 20, sufficient impetus is provided by auger assembly 44 to project the pelletizable material relatively uniformly across the width of die member 16. It is preferable to maximize the beneficial effect of gravitational forces and to prevent substantial quantities of pelletizable material from falling to the center of the die cavity rather than toward pressing zone 56. For this purpose, means is provided to preferentially direct pelletizable material toward pressing zone 56. As illustrated, such means comprises a plate 60 over opening 48 with a quadrant-shaped opening on the pressing zone 56 or outer side but blocking the inner or central side. For the same purpose, opening 48 is disposed close to pressing zone 56 as is practical in the system configuration.

The location of outlet opening 50 is a critical feature of the present invention. Specifically, it is disposed below roller 16 to deposit essentially all of the pelletizable material in the first hemisphere of rotation, substantially above the bottom point of die member 22. In the illustrated embodiment, opening 46 is at least 15° of rotation counterclockwise to the bottom point. By this location, pelletizable material falling from outlet 50 is spread out uniformly on the surface of die member 22 under the influence of gravity. Then, it is carried on that surface during rotation to the bottom of the die member where it is held against the same by centrifugal force during rotation to be carried to the second pressing zone.

By use of the above system, pelletizable material is fed directly into the wedge of roller 56 and the die member where gravity naturally carries the material to be pelleted into the wedge-shaped space where it will be trapped by the rotating die and roller surface for extrusion through the openings in the die. It is preferable to drop the material at a velocity provided by auger 48 into this wedge as the die rotates. To take advantage of gravity feed to pressing zone 58, opening 50 is disposed so that the material will be spread and accelerated under the influence of gravity as it is carried downwardly to the bottom of the die rotation before being carried upwardly toward roller 18 by centrifugal force to be pressed tightly to the pressing zone 58 in the wedge between roller 18 and die 22.

It is preferable to use roller 16 and 18 of as large a diameter as is practical in the configuration of the die cavity. This forms a relatively elongate wedge-shaped entrance to the pressing zone and facilitates the trapping of such material and forces the same through the die to be deposited without evasion. This is particularly true when steam or high humidity level materials are employed in conjunction with finely ground or high fluidity level pelletizable material. In a pellet mill with two side-by-side rollers, the maximum roller diameter is approximately equal to the radius of die member 22. As illustrated, such roller diameters are slightly less than the maximum value.

In another embodiment, not shown, the axes of rollers 16 and 18 may be disposed with a line through their axes slightly off the horizontal such as roller 16 below horizontal and roller 18 above the horizontal. This embodiment may be used so long as the variance from the horizontal is not so much as to interfere with feed from lower opening 50 into the first hemisphere of rotation above the bottom of die member 22 so that the gravitational and centrifugal forces discussed above may be employed to advantage.

In another embodiment, not shown, rollers may be mounted without a shear pin safety feature. In that instance, outlet openings 48 and 50 may project directly into the vertical plane of rollers 16 and 18 as there is no possibility of rotation of the rollers about a central axis with consequent damage to the auger conduits.

By appropriate adjustment of the amounts of feed in conduits 38 and 40 by pivot blade 42, equal amounts of pelletizable feed material may be supplied to each of pressing zones 56 and 58 permitting even wear of the two rollers. In addition, where the pelletizable material is of a type which includes gradation of particles from coarse to fine, and from heavy to light, e.g., hay, the system provides for approximately the same size distribution to be fed to both rollers. This uniform distribution of particle sizes results in corresponding excellent uniform pellet durability.

FIG. 3 illustrates an end view partially in section of another embodiment of the pellet mill in accordance with the present invention. Side-by-side rotatable roller 60 and 62 are mounted on shafts 64 and 66, respectively. Such shafts may be mounted to a pivotal door, not shown, comprising the front face of the pellet mill die cavity. This type of mounting is found in a press sold under the Swiss Combi designation. The pellet die cavity is defined by a vertical rotatable pellet die ring member 68 with cylindrical die openings 70 spaced around the die member. The die cavity is further defined at its rear vertical plane by a wall, not shown.

Figure 4:
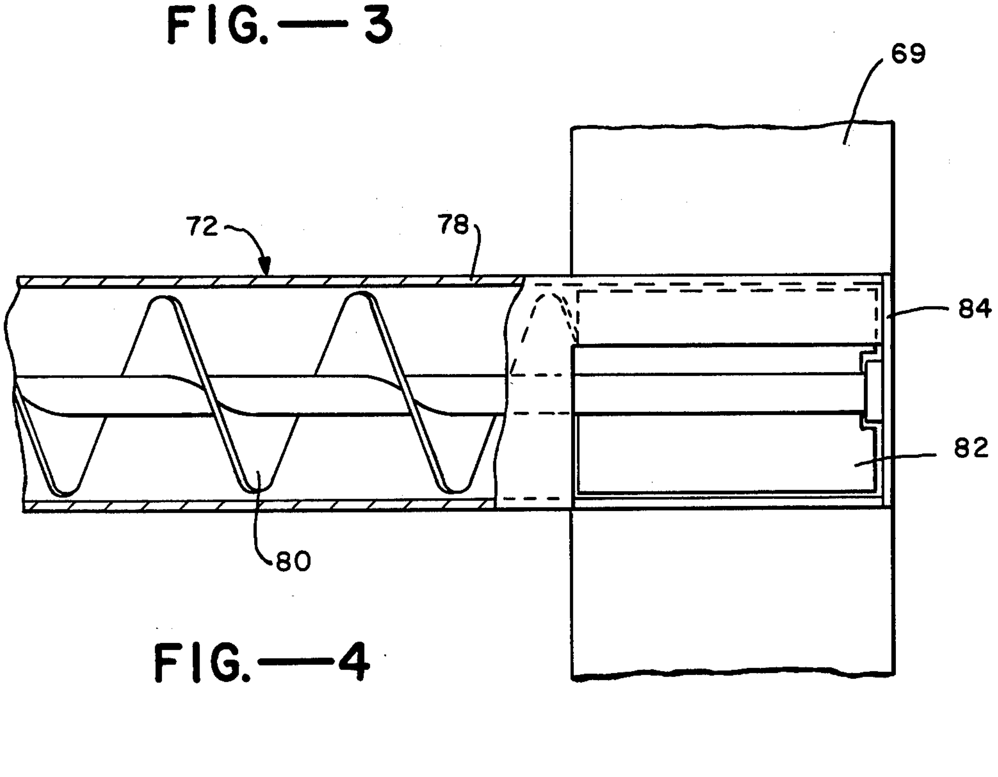
FIG. 4 is an expanded cross-sectional view of one auger conveyor for the die cavity of FIG. 3.

Referring to FIG. 4, augers 72 and 74, suitably connected to a feed mechanism as set forth in FIG. 1, project across substantially the total width of die cavity 69. Auger 72 includes a cylindrical shell 78, an auger screw 80, and a paddle 82 at the leading edge of the auger. Such leading or interior edge of the auger is sealed by a cylindrical stop wall 84. This feeding mechanism is more uniform than that of FIG. 1 as the material is fed to the die cavity along the total width of the cavity. As illustrated in FIG. 3, the portion of cylindrical shell 78 projecting into the die cavity projection includes a directional plate forming a quadrant shaped opening 86 which preferentially directs the flow of pelletizable material toward the V-shaped opening between roller 62 and die member 68. In a similar manner, conduit 74 includes a downwardly directed opening 88 which preferentially directs pelletizable material downwardly and against the die member.

It is a particular advantage of the embodiment of FIGS. 3 and 4 that the augers extend across the die cavity 69 to permit more even and uniform spreading of pelletizable material across the total face of the die member. The disadvantage of this system is that it does not permit the use of a shear pin safety mechanism as the conduits would prevent free rotation of the mounting shafts for rollers if the shear pin were broken. Thus the illustrated support shaft must be heavy duty such as provided in the Swiss Combi unit where the shafts are mounted to the interior of the door.

The mechanisms for rotation of the die member and for feeding pelletizable material into the die cavity would be the same as that illustrated with respect to the embodiment of FIG. 1. The principles of operation as that of the former embodiment applies to the present embodiment. More specifically, it utilizes the gravitational and centrifugal forces previously discussed. However, it provides an improvement by the extension of the feed conduit and augers totally across the die cavity.

What is claimed is:

1. A two roller pellet mill comprising means forming a pellet die cavity including a vertical rotatable cylindrical pellet die member first and second rollers mounted side-by-side in said die cavity each having a roller pressing surface closely adjacent to opposing inner surfaces of said die member and forming first and second pressing zones therewith, said die member being divided into first and second hemispheres of rotation along a vertical center line, said first die pressing zone being disposed in the first hemisphere of rotation of said die member from the top of the die member, and said second die pressing zone being disposed in the second hemisphere of rotation from the top of the die member, and means for feeding pelletizable material to said die cavity including first and second conduits with respective first and second outlet openings, said first outlet opening being disposed to deposit said pelletizable material in said first hemisphere of rotation above said first roller of said first die pressing zone, and said second outlet opening being disposed to deposit essentially all of said pelletizable material under said first roller and in said first hemisphere of rotation, whereby pelletizable material falling from said second outlet opening onto the die member in the first hemisphere is spread out uniformly thereon under the influence of gravity and is carried thereon during rotation to the bottom of the rotating die member where it is held against the die member by centrifugal force during rotation to be carried to the second pressing zone.

2. The pellet mill of claim 1 in which said first and second conduit outlet openings terminate at locations proximal to the die cavity without projecting into the vertical plane of said rollers.

3. The pellet mill of claim 1 in which said first and second conduit outlet openings terminate in an area in the vertical plane of said first and second rollers and extend substantially across the width of that plane.

4. The pellet mill of claim 1 in which said first and second rollers are disposed so that a line through their axes is generally horizontal.

5. The pellet mill of claim 1 together with a common supply means for pelletizable material connected to said first and second conduits, and adjustable means for splitting a stream of pelletizable material from said supply means between said first and second conduits.

* * * * *